United States Patent [19]
Johnson

[11] Patent Number: 5,253,417
[45] Date of Patent: Oct. 19, 1993

[54] METHOD OF MANUFACTURING CRANKSHAFTS

[75] Inventor: Dwayne L. Johnson, La Crescent, Minn.

[73] Assignee: Geenral Motors Corporation, Detroit, Mich.

[21] Appl. No.: 902,154

[22] Filed: Jun. 22, 1992

[51] Int. Cl.$^5$ .............................................. B23P 15/00
[52] U.S. Cl. .................... 29/888.08; 409/132
[58] Field of Search ............... 29/888.08, 6, 412–418; 409/132; 74/576

[56] References Cited

U.S. PATENT DOCUMENTS

| | | |
|---|---|---|
| 1,350,829 | 8/1920 | Murray . |
| 1,421,623 | 7/1922 | Veeder . |
| 2,333,859 | 11/1943 | Groene ........................ 29/888.08 |
| 2,395,612 | 2/1946 | Cremean . |
| 3,144,702 | 8/1964 | Wuppermann . |
| 3,793,687 | 2/1974 | Berbalk ........................ 29/6 |
| 4,269,551 | 5/1981 | Kralowetz .................... 409/132 |
| 4,494,281 | 1/1985 | Schmid ......................... 29/6 |
| 4,817,257 | 4/1989 | Mascarenas ................ 29/888.08 |
| 5,088,345 | 2/1992 | Kemmler et al. ............ 29/888.08 |
| 5,131,143 | 7/1992 | Kirchberger ................ 29/888.08 |

FOREIGN PATENT DOCUMENTS 57-22839 2/1982 Japan .

Primary Examiner—Irene Cuda
Attorney, Agent, or Firm—Patrick M. Griffin

[57] ABSTRACT

The method of manufacturing a single crank crankshaft (92) includes forging or casting a double crank (50) with two main shaft sections (54), with a common crankshaft axis (56), a crank web (58) integral with an end of each main shaft section (54) and a drive stud (60) integral with both crank webs (58) and having a drive stud axis (62) that is parallel to and spaced from the common crankshaft axis (56). Flat end surfaces (64) are machined on the ends of the main shaft sections and recesses (66) for machining centers (68) are drilled in each end of the double crank (50). The double crank (50) is then mounted in machining centers (68). A bearing engaging surface (70) and an axial locating surface (74) are machined on each crank web. A bearing engaging surface (76) is machined on each main shaft section (54). A seal engaging surface (78) is machined on each main shaft section (54) and splines (88) are formed on each end of the double crank (50). A long bearing engaging surface (82), concentric with the drive stud axis (62), is machined on the drive stud (60).

1 Claim, 2 Drawing Sheets

METHOD OF MANUFACTURING CRANKSHAFTS

TECHNICAL FIELD

The invention relates to a method of manufacturing single crank crankshafts for precision machines and more particularly to a method of manufacturing single crank crankshafts for scroll type fluid displacement machines.

BACKGROUND OF THE INVENTION

Scroll type fluid displacement machines such as scroll compressors have an orbital scroll that is driven in a generally circular orbit by a crankshaft. The crankshaft drives the orbital scroll at high speed and applies force to the orbital scroll that tends to force wraps on the orbital scroll into contact with the wraps of a fixed scroll. The crankshaft should not exert force on the orbital scroll in a direction parallel to the axis of rotation of the crankshaft.

The crankshaft in a scroll compressor drives a balance system as well as an orbital scroll. The balance system includes a scroll balancer and a crank-shaft balancer, and may also include balancing for other compressor functions and components. A balancer for the input drive may also be supported by the crankshaft.

A scroll compressor crankshaft must be accurately manufactured to drive an orbital scroll and to drive a balance system. It has been found that even small errors in machining a scroll crankshaft can result in substantial decreases in the useful life of a scroll compressor. The decrease in the useful life is primarily due to bearing misalignment. Conventional single crank crankshaft manufacturing and machining procedures have been unsatisfactory due to dimensional variations and tooling costs. Single crank crankshaft manufacturing procedures have included machining the main shaft and the web while the forging is mounted on centers. The single crank crankshaft is then removed from the centers, rechucked with a special eccentric or offset fixture which allows access to the drive stud and then the drive stud is ground. Offset fixtures are relatively expensive to make and require maintenance. This rechucking increases manufacturing deviations and increases cost. The increased manufacturing tolerance deviations increases the portion of crankshafts that are unacceptable.

SUMMARY OF THE INVENTION

An object of the invention is to accurately manufacture a single crank crankshaft.

Another object of the invention is to produce a single crank crankshaft with a drive stud having a bearing surface that is concentric with a drive stud axis and with a drive stud axis that is parallel to a crankshaft axis.

A further object of the invention is to produce a single crank crankshaft with conventional machining equipment that has exceptional dimensional accuracy.

A crankshaft with a single crank is manufactured by first forming a double crank with two main shaft sections with a common axis, a crank web integral with each main shaft section and a drive stud integral with both crank webs. The drive stud is substantially twice the length of a drive stud for a single crank and has a drive stud axis which is parallel to and spaced from the crankshaft axis. The double crank is normally cast or forged. It could also be formed by other procedures.

A recess or center for live center engagement is drilled into each end of the main shaft sections of the double crank. The double crank is then chucked between live centers.

The two main shaft sections and the two integral webs are machined while the double crank is chucked between centers. The surfaces machined include a bearing engaging surface and an axial crankshaft locating surface on the crank web. Each main shaft section has a bearing engaging surface to be machined, and a seal engaging surface to be machined. The outer ends of the main shaft sections require a spline, a key way or some other drive hub engaging system which will prevent rotation of a drive hub relative to the crankshaft. A spline or a key way can be machined in a free end of each main shaft section while the double crank is chucked between centers or after it is removed. The position of the drive hub along the crankshaft axis can be set by the end surface of each main shaft section or by a radially extending surface on each main shaft section. It is generally preferable to use the end surface of the main shaft sections.

The drive stud is machined while the double crank is still chucked between centers. A drum shaped surface, with a circular cross section that is concentric with the drive stud axis, is machined with cam grinding equipment, automotive type crankshaft grinding equipment, or other common equipment. A pair of grooves for c-clips may be cut in the drive stud. The drive stud is then severed near the center and between the two grooves for c-clips. Two crankshafts result from the severing operation.

A bore can then be drilled in the end of each main shaft section and threads can be cut in the bore. A bolt can be screwed into the threaded bore to retain a drive hub on the splines. A bore can also be drilled axially into each crank web if required.

The foregoing and other objects, features and advantages of the present invention will become apparent in light of the following detailed description of exemplary embodiments thereof, as illustrated in the accompanying drawing.

DETAILED DESCRIPTION OF THE INVENTION

Figure 1:
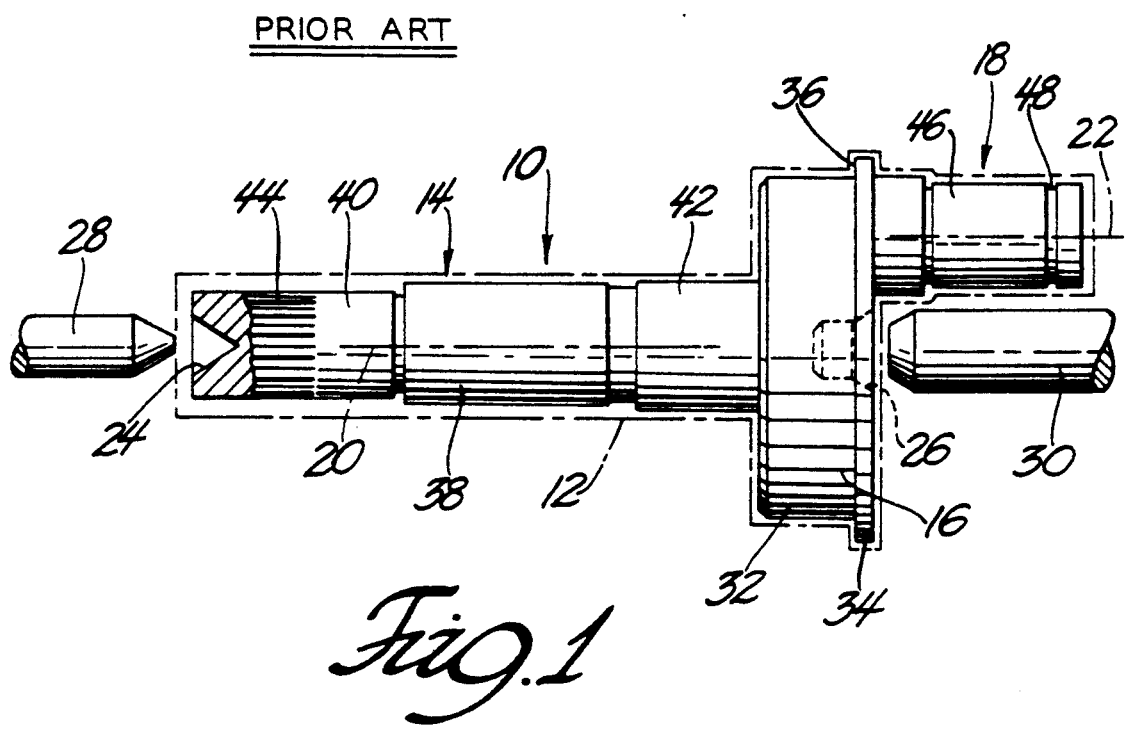
FIG. 1 is a vertical elevation of a single crank forging and machining centers used for machining the forging to produce one crankshaft by the prior art method.

The prior art crankshaft 10, shown in FIG. 1, was produced from a casting or forging indicated by the phantom lines 12. The crankshaft 10 includes a main shaft section 14, an integral web 16 and a drive stud 18. The crankshaft 10 has a crankshaft axis 20 and a stud axis 22 that is offset from and parallel to the crankshaft axis 20.

Recess 24, concentric with the crankshaft axis 20, is drilled into the end of the main shaft section 14. Another recess 26 is drilled into the integral web 16 in a position concentric with the crankshaft axis 20. The recesses 24 and 26 are used to center the crankshaft 10 between machining centers 28 and 30. While the crankshaft 10 is centered between the machining centers 28 and 30, a cylindrical drum shaped bearing engaging surface 32 is machined on the integral web 16. A flange 34, with a radially extending surface 36 is machined on the integral web 16 to axially fix a bearing race on the bearing engaging surface 32 and to axially fix the position of the crankshaft 10 in a machine housing.

A bearing engaging surface 38 is machined on the main shaft section 14. A seal engaging surface 40 is machined on the main shaft section 14. A surface 42 is also be machined on the main shaft section 14. Splines 44 are machined on the end of the main shaft section 14 for receiving a crankshaft drive hub with with internal splines. The functions of surface 40 and surface 38 can be reversed so that surface 40 becomes a bearing engaging surface and surface 38 becomes a seal engaging surface, if desired. When a seal is provided between the surfaces that engage bearings, separate lubrication systems are required for the bearings.

The prior art crankshafts 10 are removed from the machining centers 28 and 30, after surfaces concentric with the crankshaft axis 20 have been machined. The crankshaft 10 is then rechucked in a special eccentric fixture and the bearing surface 46 on drive stud 18 is machined. A c-clip groove 48 is cut into the end of the drive stud 18. The rechucking, prior to machining the drive stud 18, is expensive and introduces errors in alignment between the main shaft section 14 and the drive stud 18.

Figure 2:
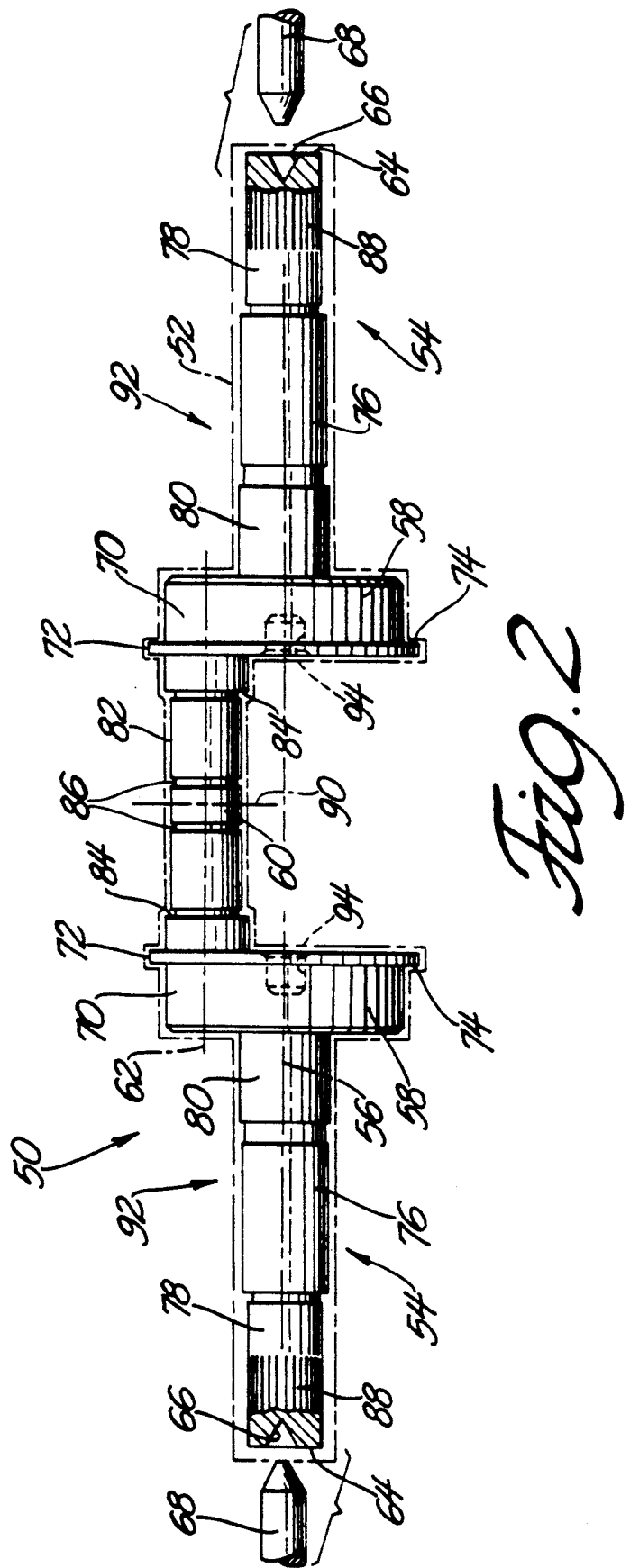
FIG. 2 is a vertical elevation of a double crank type crankshaft forging and machining centers used for machining two single crank crankshafts by the method of this invention.

The dimensional inaccuracies, common in the prior art crankshafts manufactured as set forth above, are reduced by forging or casting a double crank 50, shown in FIG. 2. Phantom lines 52 indicate the double crank prior to machining. All surfaces of the double crank may be machined. It may be desirable to machine the surfaces to insure that they will fit in machine housings when completed and to avoid balancing problems. However, if forging or casting is sufficiently accurate machining of some surfaces may be avoided. The double crank 50 includes two main shaft sections 54 with a common crank axis 56. An integral web 58 is formed on the adjacent ends of each main shaft section 54. The integral webs 58 are joined by an elongated drive stud 60 with a stud axis 62 that is offset from and parallel to the common crank axis 56.

Flat surfaces 64 are machined on the free ends of the main shaft sections 54. Centers or recesses 66 are drilled into the free ends of the main shaft sections 54 in positions concentric with the common crank axis 56. The recesses 66 receive machining centers 68 which mount the double crank 50 in machine tools.

A drum shaped bearing engaging surface 70 is machined on each integral web 58. A flange 72, with a radially extending surface 74, is also machined on each integral web 58. The radially extending surface 74 can contact a bearing on the bearing engaging surface 70 to axially fix the position of the integral web 58.

A bearing engaging surface 76 is machined on each main shaft section 54. A seal engaging surface 78 can be machined on each main shaft section 54 between the flat surface 64 and the bearing engaging surface 76. A transition section surface 80 can also be machined on each main shaft section between the bearing engaging surface 76 and internal web 58.

The functions of the surfaces 76 and 78 can be reversed if desired so that surface 76 is a seal engaging surface and surface 78 is a bearing engaging surface. With such an arrangement a bearing on the bearing engaging surface 70 could be lubricated by lubricant in the fluid being displaced and the bearing that engages the cylindrical surface 78 would require a separate lubrication system. A bearing in engagement with the cylindrical surface 78 could for example be a sealed bearing with a life time supply of lubricant. Some machines may not require a seal engaging surface on the main shaft section 54.

A bearing surface 82 is machined on the drive stud 60 between the two integral webs 58. Stop surfaces 84 are machined at both ends of the bearing surface 82 to limit movement of linkages or other members journaled on the bearing surface 82 along the stud axis 62 toward an integral web 58. The bearing surface 82, on the drive stud 60, can be machined on a conventional crankshaft grinding machines which are sometimes referred to as cam grinding machine while the double crank 52 is between two machining centers 68. Two grooves 86 may be cut in the drive stud 60 for c-clips. If a retaining system other than c-clips is employed to retain a member on the bearing surfaces 82, the grooves 86 will not be required.

Splines 88 are machined on the free ends of each main shaft section 54 between an adjacent flat surface 64 and a seal engaging surface 78.

Non-contact surfaces on the double crank, such as the end surfaces of the integral webs 58, and the transition section surface 80 need not be machined if casting tolerances are small. If casting tolerances are too large machining of these surfaces may be required to reduce weight and reduce balancing problems. Machining the non-contact surfaces may also be necessary to insure that the crankshafts can be mounted in a machine with minimal space for a crankshaft.

The double crank 50 is then separated into two single cranks by cutting the center of the drive stud in a place at a right angle to the stud axis 62 along the center line 90.

The two single cranks 92, formed by the cutting of the drive stud 60, along the center line 90, have a bore 94 concentric with the common crank axis 56 drilled into each integral web 58. The bores 94 receive pins which limit the movement of a link journaled on the drive stud 60 when the single crank is used in a scroll type compressor for an air conditioning system.

Bores can be drilled in the ends of the main shaft sections 54, where the recesses 66 are located and threads can be cut in these bores. Each threaded bore receives a bolt for holding a drive hub on the splines 88 for driving a single crank 92.

The order in which some surfaces on the double cranks are machined is a matter of choice. Critical surfaces, such as the bearing engaging surfaces 70, the bearing engaging surface 76 and the bearing surface 82 must be machined before the drive stud 60 is severed along center line 90. It is important to insure that the bearing engaging surfaces 70 and the bearing engaging surfaces 76 are concentric with the common crank axis. It is also important to insure that the bearing surface 82 is concentric with the stud axis 62 and that the stud axis 62 is parallel to the common crank axis 56. Seal engaging surfaces 78 should also be concentric with the common crank axis 56. The splines 88 are not as critical. The splines 88 could, therefore, be machined after the double crank 50 is cut at centerline 90 to form two single cranks 92.

The preferred embodiment of the invention has been described in detail but is an example only and the invention is not restricted thereto. It will be easily understood by those skilled in the art that modifications and variations can easily be made within the scope of the invention.

I claim:

1. A method of manufacturing crankshafts, including the steps of;

forging a double crank with two main shaft sections with a common crankshaft axis, a crank web integral with each main shaft section and a drive stud integral with both crank webs and having a drive stud axis that is parallel to and spaced from the crankshaft axis;

machining recesses for machining centers in each end of the double crank;

machining splines on each end of the double crank;

machining a seal engaging surface of each main shaft section;

machining a bearing engaging surface on each main shaft section;

machining a bearing engaging surface and an axial locating surface on each crank web;

machining a surface on the drive stud that is concentric with the drive stud axis;

severing the drive stud between the two crank webs to form two single cranks from the double crank;

machining a bore in each crank web with an axis that is parallel to the common crankshaft axis; and machining a threaded bore in a free end of each main shaft section.

* * * * *